US012067712B2

United States Patent
Popescu et al.

(10) Patent No.: US 12,067,712 B2
(45) Date of Patent: Aug. 20, 2024

(54) COMPLEX SYSTEM FOR CONTEXTUAL MASK GENERATION BASED ON QUANTITATIVE IMAGING

(71) Applicant: The Board of Trustees of the University of Illinois, Urbana, IL (US)

(72) Inventors: Gabriel Popescu, Champaign, IL (US); Mikhail Eugene Kandel, Champaign, IL (US); Yuchen He, Urbana, IL (US); Nahil A. Sobh, Urbana, IL (US); Matthew Benjamin Wheeler, Tolono, IL (US); Marcello Rubessa, Middleton, WI (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 479 days.

(21) Appl. No.: 17/178,486

(22) Filed: Feb. 18, 2021

(65) Prior Publication Data

US 2021/0256692 A1  Aug. 19, 2021

Related U.S. Application Data

(60) Provisional application No. 62/978,194, filed on Feb. 18, 2020.

(51) Int. Cl.
G06T 7/00 (2017.01)
(52) U.S. Cl.
CPC .. *G06T 7/0012* (2013.01); *G06T 2207/10056* (2013.01); *G06T 2207/10072* (2013.01); *G06T 2207/20081* (2013.01); *G06T 2207/20084* (2013.01); *G06T 2207/30024* (2013.01)

(58) Field of Classification Search
CPC ......... G06T 7/0012; G06T 2207/10056; G06T 2207/10072; G06T 2207/20081; G06T 2207/20084; G06T 2207/30024; G06T 2207/30044
See application file for complete search history.

(56) References Cited

PUBLICATIONS

Valkonen et al. "Cytokeratin-Supervised Deep Learning for Automatic Recognition of Epithelial Cells in Breast Cancers Stained for ER, PR, and Ki-67." IEEE Transactions on Medical Imaging, vol. 39, No. 2, Feb. 2020, Publication Date: Aug. 7, 2019, pp. 534-542 (Year: 2019).*

Akbari et al. "Automatic Segmentation of Sperm's Parts in Microscopic Images of Human Semen Smears Using Concatenated Learning Approaches." Computers in Biology and Medicine, 109, 2019, pp. 242-253 (Year: 2019).*

(Continued)

*Primary Examiner* — Jon Chang
(74) *Attorney, Agent, or Firm* — Crowell & Moring LLP

(57) ABSTRACT

A system generates a context mask based on quantitative image data. The system obtains the quantitative image data which was captured via a quantitative imaging of a sample. The quantitative image data is compared to previous quantitative image data through application of the quantitative image data to a neural network trained using the previous quantitative image data and corresponding constructed context masks. The comparison generates the context mask for the quantitative image data. The context mask provides context for the quantitative parameter values that facilities characterization of the sample.

19 Claims, 9 Drawing Sheets

(56) References Cited

PUBLICATIONS

Ahmed, D., et al., Epigenetic and genetic features of 24 colon cancer cell lines. *Oncogenesis* 2, e71 (2013).
Aitken, C.E., Marshall, R.A., Puglisi, J.D., An oxygen scavenging system for improvement of dye stability in single-molecule fluorescence experiments. *Biophys J* 94, 1826-1835 (2008).
Arnison, M.R., Cogswell, C.J., Smith, N.I., Fekete, P.W., Larkin, K.G., Using the Hilbert transform for 3D visualization of differential interference contrast microscope images. *J Microsc* 199, 79-84 (2000).
Berkovitz, A., et al. (2006) How to improve IVF-ICSI outcome by sperm selection. Reproductive *biomedicine online* 12(5):634-638.
Banaszewska, D., Andraszek, K., Czubaszek, M., & Biesiada-Drzazga, B., (2015) The effect of selected staining techniques on bull sperm morphometry. *Animal reproduction science* 159:17-24.
Barer, R., (1952) Interference microscopy and mass determination. *Nature* 169(4296):366-367.
Bartolacci, A., et al. (2018) Abnormal sperm concentration and motility as well as advanced paternal age compromise early embryonic development but not pregnancy outcomes: a retrospective study of 1266 ICSI cycles. *J Assist Reprod Genet.*
Bhaduri, B., et al., Cardiomyocyte imaging using real-time spatial light interference microscopy (SLIM). *PloS one* 8, e56930-e56930 (2013).
Brennan, D.J., et al., Altered cytoplasmic-to-nuclear ratio of survivin is a prognostic indicator in breast cancer. *Clin Cancer Res* 14, 2681-2689 (2008).
Campagnola, P.J., Wei, M.D., Lewis, A., Loew, L.M., High-resolution nonlinear optical imaging of live cells by second harmonic generation. *Biophys J* 77, 3341-3349 (1999).
Cavalieri, F.L.B., et al. (2018) Improvement of bovine in vitro embryo production by ovarian follicular wave synchronization prior to ovum pick-up. *Theriogenology* 117:57-60.
Charriere, F., et al. (2006) Cell refractive index tomography by digital holographic microscopy. *Opt. Lett.* 31(2):178-180.
Choi, W., et al. (2007) Tomographic phase microscopy. *Nature methods* 4(9):717.
Christiansen, E.M., et al., In Silico Labeling: Predicting Fluorescent Labels in Unlabeled Images. *Cell* 173, 792-803 e719 (2018).
Davies, H.G. & Wilkins, M.H., (1952) Interference microscopy and mass determination. *Nature* 169(4300):541.
Diaspro, A., Optical Fluorescence Microscopy. *Optical Fluorescence Microscopy by Alberto Diaspro*. Berlin: Springer, 2011. ISBN: 978-3-642-15174-3 1, (2011).
Dixit, R., Cyr, R., Cell damage and reactive oxygen species production induced by fluorescence microscopy: effect on mitosis and guidelines for non-invasive fluorescence microscopy. *Plant J* 36, 280-290 (2003).
Dubertret, B., et al., In vivo imaging of quantum dots encapsulated in phospholipid micelles. *Science* 298, 1759-1762 (2002).
Edgar, B.A., Kiehle, C.P., Schubiger, G., Cell cycle control by the nucleo-cytoplasmic ratio in early *Drosophila* development. *Cell* 44, 365-372 (1986).
Edwards, C., et al., Effects of spatial coherence in diffraction phase microscopy. *Opt. Express* 22, 5133-5146 (2014).
Evanko, D., Heinrichs, A., Rosenthal, C., Milestones in light microscopy. *Nature Cell Biol.*, S5-S20 (2009).
Gomendio, M. & Roldan, E.R., (2004) Implications of diversity in sperm size and function for sperm competition and fertility. *International Journal of Developmental Biology* 52(5-6):439-447.
Haifler, M., et al. (2015) Interferometric phase microscopy for label-free morphological evaluation of sperm cells. *Fertil Steril* 104(1):43-47 e42.
He, K., Zhang, X., Ren, S., Sun, J., in *Proceedings of the IEEE conference on computer vision and pattern recognition*. (2016), pp. 770-778.
Hoebe, R.A., et al., Controlled light-exposure microscopy reduces photobleaching and phototoxicity in fluorescence live-cell imaging. *Nat Biotechnol* 25, 249-253 (2007).

Hoffman, R. & Gross, L., (1975) Modulation contrast microscope. *Appl Optics* 14(5):1169-1176.
Horstmeyer, R., Heintzmann, R., Popescu, G., Waller, L. & Yang, C., (2016) Standardizing the resolution claims for coherent microscopy. *Nat Photonics* 10:68-71.
Hu, C., Popescu, G., Quantitative Phase Imaging (QPI) in Neuroscience. *IEEE Journal of Selected Topics in Quantum Electronics* 25, 1-9 (2019).
Humphries, S., Evans., J.P., & Simmons, L.W., (2008) Sperm competition: linking form to function. *BMC Evol Biol* 8(1):319.
Imai, R., et al., Density imaging of heterochromatin in live cells using orientation-independent-DIC microscopy. *Mol Biol Cell* 28, 3349-3359 (2017).
Ioffe, S., Szegedy, C., Batch normalization: Accelerating deep network training by reducing internal covariate shift. *arXiv preprint arXiv:1502.03167*, (2015).
Isola, P., Zhu, J.-Y., Zhou, T., Efros, A.A., in *Proceedings of the IEEE conference on computer vision and pattern recognition*. (2017), pp. 1125-1134.
Kamm, R.D., et al., Perspective: The promise of multi-cellular engineered living systems. *APL Bioeng* 2, 040901 (2018).
Kandel, M.E., et al., Cell-to-cell influence on growth in large populations. *Biomed Opt Express* 10, 4664-4675 (2019).
Kandel, M.E., et al., Epi-illumination gradient light interference microscopy for imaging opaque structures. *Nat Commun* 10, 4691 (2019).
Kandel, M.E., et al., Label-free tissue scanner for colorectal cancer screening. *J Biomed Opt* 22, 66016 (2017).
Kandel, M.E., et al., *Phase Imaging with Computational Specificity (PICS) for measuring dry mass changes in sub-cellular compartments*, arXiv: 2002.08361v2 (Mar. 13, 2020).
Kandel, M.E., et al., *PICS: Phase Imaging with Computational Specificity*, ar Xiv: 2002.08361v1 (Feb. 19, 2020).
Kandel, M.E., et al. (2017) Three-dimensional intracellular transport in neuron bodies and neurites investigated by label-free dispersion-relation phase spectroscopy. *Cytometry Part A*:n/a-n/a.
Kandel, M.E., Fanous, M., Best-Popescu, C., Popescu, G., Real-time halo correction in phase contrast imaging. *Biomed Opt Express* 9, 623-635 (2018).
Kim, T., et al., White-light diffraction tomography of unlabelled live cells. *Nature Photonics* 8, 256-263 (2014).
Kingma, D.P. & Ba, J., (2014) Adam: A method for stochastic optimization. *arXiv preprint arXiv:1412.6980*.
Kondracki, S., Wysokinska, A., Kania, M. & Gorski, K., (2017) Application of Two Staining Methods for Sperm Morphometric Evaluation in Domestic Pigs. *Journal of veterinary research* 61(3):345-349.
Lee, K., et al. (2013) Quantitative phase imaging techniques for the study of cell pathophysiology: from principles to applications. *Sensor* 13(4):4170-4191.
Lee, Y.J., et al., Quantitative assessment of neural outgrowth using spatial light interference microscopy. *J Biomed Opt* 22, 66015 (2017).
Li, Y., Fanous, M.J., Kilian, K.A., Popescu, G., Quantitative phase imaging reveals matrix stiffness-dependent growth and migration of cancer cells. *Sci Rep* 9, 248 (2019).
Liu, L., et al. (2018) Topography and refractometry of sperm cells using spatial light interference microscopy. *Journal of biomedical optics* 23(2):025003.
Mahjoubfar, A., Chen, C. L., Jalali, B., in *Artificial Intelligence in Label-free Microscopy*. (Springer, 2017), pp. 73-85.
Majeed, H., et al. (2019) Quantitative Histopathology of Stained Tissues using Color Spatial Light Interference Microscopy (cSLIM). *Scientific reports* 9(1):14679.
Majeed, H., Nguyen, T.H., Kandel, M.E., Kajdacsy-Balla, A., Popescu, G., Label-free quantitative evaluation of breast tissue using Spatial Light Interference Microscopy (SLIM). *Sci Rep* 8, 6875 (2018).
Majeed, H., Okoro, C., Kajdacsy-Balla, A., Toussaint, K.C., Jr., Popescu, G., Quantifying collagen fiber orientation in breast cancer using quantitative phase imaging. *J Biomed Opt* 22, 46004 (2017).

(56) References Cited

PUBLICATIONS

Malo, A.F., et al. (2005) Male fertility in natural populations of red deer is determined by sperm velocity and the proportion of normal spermatozoa. *Biol Reprod* 72(4):822-829.

Malo, A.F., et al. (2006) Sperm design and sperm function. *Biol Lett* 2(2):246-249.

Maree, L., du Plessis, S.S., Menkveld, R. & van der Horst, G., (2010) Morphometric dimensions of the human sperm head depend on the staining method used. *Human reproduction* (Oxford, England) 25(6):1369-1382.

Meng, M.V., Greene, K.L., & Turek, P.J., (2005) Surgery or assisted reproduction? A decision analysis of treatment costs in male infertility. *The Journal of urology* 174(5):1926-1931; discussion 1931.

Merola, F., Memmolo, P., Miccio, L., Mugnano, M. & Ferraro, P., (2018) Phase contrast tomography at lab on chip scale by digital holography. *Methods* 136:108-115.

Miccio, L., et al. (2011) Detection and visualization improvement of Spermatozoa cells by Digital Holography. *Molecular Imaging Iii* 8089.

Mir, M., Bergamaschi, A., Katzenellenbogen, B.S. & Popescu, G., (2014) Highly Sensitive Quantitative Imaging for Monitoring Single Cancer Cell Growth Kinetics and Drug Response. *PLoS One* 9(2):e89000.

Mir, M., et al., Optical measurement of cycle-dependent cell growth. *Proc. Nat. Acad. Sci.* 108, 13124 (2011).

Nadalini, M., Tarozzi, N., Distratis, V., Scaravelli, G. & Borini, A., (2009) Impact of intracytoplasmic morphologically selected sperm injection on assisted reproduction outcome: a review. *Reproductive biomedicine online* 19:45-55.

Nguyen, T.H., Edwards, C., Goddard, L.L., Popescu, G., Quantitative phase imaging with partially coherent illumination. *Opt Lett* 39, 5511-5514 (2014).

Nguyen, T.H., et al., Automatic Gleason grading of prostate cancer using quantitative phase imaging and machine learning. *J Biomed Opt* 22, 36015 (2017).

Nguyen, T.H., Kandel, M.E., Rubessa, M., Wheeler, M.B., Popescu, G., Gradient light interference microscopy for 3D imaging of unlabeled specimens. *Nat Commun* 8, 210 (2017).

Nvidia, in *Best Practices for Tensorrt Performance*. chap. 2, pp. 9.

Ounjai, P., Kim, K.D., Lishko, P.V. & Downing, K.H., (2012) Three-Dimensional Structure of the Bovine Sperm Connecting Piece Revealed by Electron Cryotomography1. *Biology of Reproduction* 87(3).

Ounkomol, C., Seshamani, S., Maleckar, M.M., Collman, F., Johnson, G.R., Label-free prediction of three-dimensional fluorescence images from transmitted-light microscopy. *Nat Methods* 15, 917-920 (2018).

Park, J., et al., Decellularized Matrix Produced by Mesenchymal Stem Cells Modulates Growth and Metabolic Activity of Hepatic Cell Cluster. *Acs Biomaterials Science & Engineering* 4, 456-462 (2018).

Park, Y., Depeursinge, C., Popescu, G., Quantitative phase imaging in biomedicine. *Nature Photonics* 12, 578-589 (2018).

Parrish, J.J., et al. (1986) Bovine in vitro fertilization with frozen-thawed semen. Theriogenology 25(4):591-600.

Popescu, G., *BiOS Hot Topics: Quantitative Phase Imaging*, presentation Feb. 7, 2020.

Popescu, G., Quantitative phase imaging of cells and tissues. McGraw-Hill biophotonics (McGraw-Hill, New York, 2011).

Popescu, G, et al. (2008) Optical imaging of cell mass and growth dynamics. *Am J Physiol Cell Physiol* 295(2):C538-544.

Riss, T.L., et al., in Assay Guidance Manual, G. S. Sittampalam et al., Eds. (Eli Lilly & Company and the National Center for Advancing Translational Sciences, Bethesda (MD), 2004).

Rivenson, Y., et al., PhaseStain: the digital staining of label-free quantitative phase microscopy images using deep learning. *Light Sci Appl* 8, 23 (2019).

Rivenson, Y., et al., Virtual histological staining of unlabelled tissue-autofluorescence images via deep learning. *Nat Biomed Eng* 3, 466-477 (2019).

Ronneberger, O., Fischer, P., Brox, T., in *International Conference on Medical image computing and computer-assisted intervention*. (Springer, 2015), pp. 234-241.

Rubessa, M., Ambrosi, A., Gonzalez-Pena, D., Polkoff, K.M. & Wheeler, M.B., (2018) Non-invasive nuclear magnetic resonance analysis of male and female embryo metabolites during in vitro embryo culture. *Metabolomics : Official journal of the Metabolomic Society* 14(9):113.

Rubessa, M., Lotti, S.N., Kandel, M.E., Popescu, G., Wheeler, M.B., SLIM microscopy allows for visualization of DNA-containing liposomes designed for sperm-mediated gene transfer in cattle. *Mol Biol Rep* 46, 695-703 (2019).

Sathananthan, A.H., et al. (1997) inheritance of sperm centrioles and centrosomes in bovine embryos. *Arch Androl* 38(1):37-48.

Sattar, A., et al. (2011) The influence of gamete co-incubation length on the in vitro fertility and sex ratio of bovine bulls with different penetration speed. *Reprod Domest Anim* 46(6):1090-1097.

Schneider, I. & Ellenberg, J., (2019) Mysteries in embryonic development: How can errors arise so frequently at the beginning of mammalian life? *PLoS Biol* 17(3):e3000173.

Suarez, S.S. & Ho, H.C., (2003) Hyperactivated motility in sperm. *Reprod Domest Anim* 38(2):119-124.

Su, T.W., Xue, L., & Ozcan, A., (2012) High-throughput lensfree 3D tracking of human sperms reveals rare statistics of helical trajectories. *Proc Natl Acad Sci U S A* 109(40):16018-16022.

Sung, W.W., et al., High nuclear/cytoplasmic ratio of Cdk1 expression predicts poor prognosis in colorectal cancer patients. *BMC Cancer* 14, 951 (2014).

Tervit, H.R., Whittingham, D.G. & Rowson, L.E., (1972) Successful culture in vitro of sheep and cattle ova. *Journal of reproduction and fertility* 30(3):493-497.

Tzur, A., Kafri, R., LeBleu, V.S., Lahav, G., Kirschner, M.W., Cell growth and size homeostasis in proliferating animal cells. *Science* 325, 167-171 (2009).

Wang, Z., et al., Spatial light interference microscopy (SLIM). *Opt. Express* 19, 1016-1026 (2011).

Wang, Z., Tangella, K., Balla, A., Popescu, G., Tissue refractive index as marker of disease. *J Biomed Opt* 16, 116017 (2011).

Weaver, S.Sridharan., et al., Simultaneous cell traction and growth measurements using light. *J Biophotonics* 12, e201800182 (2019).

Wurm, F.M., Production of recombinant protein therapeutics in cultivated mammalian cells. *Nat Biotechnol* 22, 1393-1398 (2004).

Vanderzwalmen, P., et al. (2019) Intracytoplasmic Morphologically selected sperm injected. *In Vitro Ferilization*, (Springer), pp. 415-428.

Young, Ju Jo, et al., *Quantitative Phase Imaging and Artificial Intelligence: A Review* (2018).

Zacharias, D.A., Violin, J.D., Newton, A.C., Tsien, R. Y., Partitioning of lipid-modified monomeric GFPs into membrane microdomains of live cells. *Science* 296, 913-916 (2002).

Zernike, F., How I discovered phase contrast. *Science* 121, 345 (1995).

Zicha, D., Genot, E., Dunn, G.A. & Kramer, I.M., (1999) TGF beta 1 includes a cell-cycle-dependent increase in motility of epithelial cells. *J. Cell Sci.* 112(4):447-454.

\* cited by examiner

US 12,067,712 B2

COMPLEX SYSTEM FOR CONTEXTUAL MASK GENERATION BASED ON QUANTITATIVE IMAGING

PRIORITY

This application claims priority to U.S. Provisional Application No. 62/978,194, filed Feb. 18, 2020, and titled Phase Imaging with Computational Specificity, which is incorporated by reference in its entirety.

STATEMENT REGARDING FEDERALLY SPONSORED RESEARCH OR DEVELOPMENT

This invention was made with government support under contract number 0939511 awarded by the National Science Foundation and contract numbers R01 GM129709 and R01 CA238191 awarded by the National Institutes of Health. The government has certain rights in the invention.

TECHNICAL FIELD

This disclosure relates to generating contextual masks for quantitative images.

BACKGROUND

Rapid advances in biological sciences have resulted in increasing application of microscopy techniques to characterize biological samples. As an example, microscopy is in active usage in research-level and frontline medical applications. Accordingly, trillions of dollars' worth of biological research and applications are dependent on microscopy techniques. Improvements in microscopy systems will continue to improve the performance and adoption of microscopy systems.

DETAILED DESCRIPTION

Figure 1:
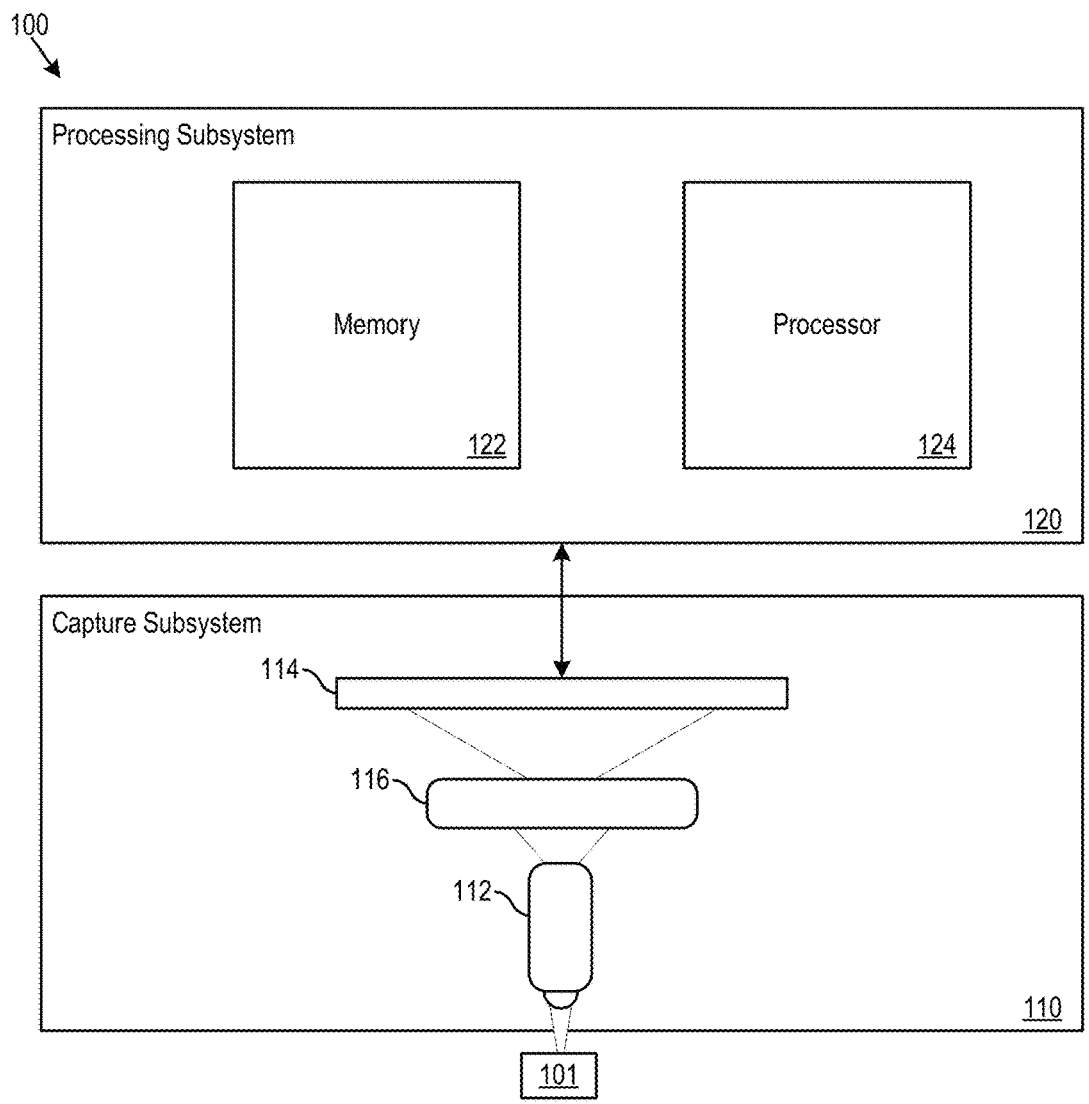
FIG. 1 shows an example device for contextual mask generation.

Quantitative imaging includes various imaging techniques that provide quantifiable information in addition to visual data for an image. For example, fluorescence imaging may provide information on the type and/or condition of a sample under test via usage of a dye that attaches to and/or penetrates into (e.g., biological) materials in specific circumstances. Another example, phase imaging, may use phase interference (e.g., as a comparative effect) to probe dry mass density, material transport, or other quantifiable characteristics of a sample.

In various scenarios, for a given quantitative image obtained using a given quantitative imaging (QI) technique, sources for contextual interpretation and/or contextual characterizations supported by other QI techniques may be unavailable. In an illustrative scenario, a live cell sample may be imaged using a quantitative phase imaging (QPI) that leaves the sample unharmed. However, to characterize various states of the sample it may be advantageous to have access to fluorescence imaging data in addition to (or instead of) the available QPI data. In this scenario, a challenge may entail obtaining such fluorescence imaging data without harming the live cell sample. A system that provided fluorescence imaging data and QPI data using non-destructive QPI would overcome this challenge. Further, example QI techniques may include diffraction tomography (e.g., white-light diffraction tomography) and Fourier transform light scattering.

In another illustrative scenario, one or more quantitative images may provide data to support characterization of various cell parts (or other biological structures), but the number parts or images may be too numerous for expert identification of the parts within the images to be feasible. A system the provided labelling of cell parts within the quantitative images without expert input for each image/part would overcome this challenge.

The techniques and architectures discussed herein provide solutions to the above challenges (and other challenges) by using quantitative image data (QID) as input to generate contextual masks. The generated contextual masks may provide mappings of expected context to pixels of the QID. For example, a contextual mask may indicate whether a pixel within QID depicts (e.g., at least a portion of) a particular biological structure. In an example, a contextual mask may indicate an expected fluorescence level (and/or dye concentration level) at a pixel. Providing an indication of the expected fluorescence level at a pixel may allow for a QID image (other than a fluorescent-dye-labeled image) to have the specificity of a fluorescent-dye-labeled image without imparting the harm to biological materials that is associated with some fluorescent dyes.

Further, the QID may additionally have the quantitative parameters (e.g., per-pixel quantitative data) present in the QID without mask generation. Accordingly, either QID plus a contextual mask may have more data to guide analysis of a sample than the contextual mask or the QID would have alone. In an example scenario, a contextual mask may be generated from QID where the contextual mask labels biological structures represented by pixels in the QID. The quantitative parameters for the pixels present in the QID may then be referenced against data in a structural index to characterize the biological structures based on the indications of which pixels represent which biological structures. In a real world example, QPI may be used to image spermatozoa. A contextual mask that labels the various structures of the spermatozoa may be generated. The QPI data, which may be used to determine properties such a dry mass ratios, volume, mass transport, and other quantifiable parameters may be referenced against a database of such factors indexed for viability at various stages of reproductive development. Based on the database reference, a viability determination may be made for the various spermatozoa imaged in the QPI data. Thus, the contextual mask and QPI data acquisition system may be used as an assistive-reproductive-technology (ART) system that aids in the selection of viable spermatozoa from a group of spermatozoa with varying levels of viability.

ART is a multibillion-dollar industry with applications touching various other industries including family planning and agriculture. A significant bottleneck in the industry is the reliance on human expertise and intuition to select gametes, zygotes, blastocysts, and other biological specimens from among others ensure that those in better condition are used first (e.g., to avoid millions of dollars of wasted investment on attempted reproduction using ultimately non-viable specimens). Accordingly, a contextual identification of biological structures within QID followed by quantitative characterization of those biological structures using quantitative parameters in the QID will provide a commercial advantage over existing technologies because use of contextual mask generation and quantitative parameter characterization will reduce waste in investments (both time and monetary) made in non-viable specimens. Similarly, contextual identification of biological structures within QID followed by quantitative characterization of those biological structures using quantitative parameters in the QID will provide commercial success because the reduction in waste will provide marginal value well in excess of the production and purchase costs of the system.

In various implementations, the contextual mask may be generated by providing QID as an input to neural network, which provides the contextual mask as an output. The neural network may be trained using input-result pairs. The input-result pairs may be formed using QID of the desired input type captured from test samples and constructed context masks that include the desired output context for the test samples. The constructed context masks may refer to context masks that are generated using the nominal techniques for obtaining the desired output context. For example, a constructed context mask including fluorescence-contrast image may be obtained using fluorescence-contrast imaging. In an example, a constructed context mask including expert-identified biological structure indications may be obtained using human expert input. The input-result pairs may be used to adjust the interneuron weights within neural network during the training process. After training, the neural network may be used to compare current QID to the training QID used in training process via the interneuron weights. This comparison then generates a context mask (e.g., a simulated context mask, a mask with expected contextual values, or other) without use of the nominal technique. Thus, using the trained neural network, a context mask with the desired output context may be obtained even when then performance of nominal technique is undesirable (e.g., because of harmful effects), impracticable (e.g., because of limited expert capacity/availability), or otherwise unavailable.

In various implementations, generation of a contextual mask based on QID may be analogous to performing image transformation operation on the QID. Accordingly, various machine-learning techniques to support image transformation operations may be used (e.g., including classification algorithms, convolutional neural networks, generative adversarial networks (GAN), or other machine learning techniques to support image transformation/translation). In various implementations, a "U-net" type convolutional neural network may be used.

Referring now to FIG. 1 an example device 100 for contextual mask generation is shown. The example device 100 may include a capture subsystem 110 for capture of QID images of a sample 101. In the example, the capture subsystem includes an objective 112 and a pixel array 114. In various implementations, the capture subsystem 110 may include a processing optic 116 that may generate a comparative effect (e.g., a tomographical effect, a differential interference effect, a Hoffman contrast effect, a phase interference effect, Fourier transform effect, or other comparative effect) that may allow for the capture of QID (beyond visual data). In some implementations, QID may be obtained from dyes, sample processing, or other techniques in lieu of a comparative effect.

The pixel array 114 may be positioned at an image plane of the objective 112 and/or a plane of the comparative effect generated via the processing optic 116. The pixel array 114 may include a photosensitive array such as a charge-coupled device (CCD), complimentary metal-oxide-semiconductor (CMOS) sensor, or other sensor array.

The processing optic 116 may include active and/or passive optics that may generate a comparative effect from light rays focused trough the objective 112. For example, in a QPI-based system on gradient light inference microscopy (GLIM) the processing optic 116 may include a prism (e.g., a Wollaston prism, a Normanski prism, or other prism) that generates two replicas of an image field with a predetermined phase shift between them. In an example based on spatial light interference microscopy, the processing optic 116 may include a spatial light modulator (SLM) between two Fourier transforming optics (e.g., lenses, gratings, or other Fourier transforming optics). The controllable pixel elements of the SLM may be used to place selected phase-shifts on frequency components making up a particular light ray. Other comparative effects and corresponding processing optics 116 may be used.

The example device 100 may further include a processing subsystem 120. The processing subsystem may include memory 122 and a hardware-based processor 124. The memory 122 may store raw pixel data from the pixel array 114. The memory may further store QID determined from the raw pixel data and/or instructions for processing the raw pixel data to obtain the QID. Thus, the QID may include pixel values including visual data from the raw pixel data and/or quantitate parameters derived from analysis of the comparative effect and the pixel values of the raw pixel data. The memory may store a neural network (or other machine learning protocol) to generate a context mask based on the QID. The memory may store the context mask after generation.

In some distributed implementations, not shown here, the processing subsystem 120 (or portions thereof) may be physically removed from the capture subsystem 110. Accordingly, the processing subsystem 120 may further include networking hardware (e.g., as discussed with respect to context computation environment (CCE) 500 below) that may receive raw pixel data and/or QID in a remotely captured and/or partially remotely-pre-processed form.

The processor 124 may execute instructions stored on the memory to derive quantitative parameters from the raw pixel data. Further, the processor 124 may execute the neural network (or other machine learning protocol) stored on the memory 122 to generate the context mask.

In some implementations, the example device 100 may support a training mode where constructed context masks and training QID are obtained contemporaneously (in some cases simultaneously). For example, a test sample may be prepared with contrast dye and then imaged using the capture subsystem 110. The processing subsystem may use fluorescence intensities present in the raw pixel data as a constructed context mask. In some cases, the fluorescence intensities present in the raw pixel data may be cancelled (e.g., through a normalization process, through symmetries in the analysis of the comparative effect, or through another cancellation effect of the QID derivation) during extraction of the quantitative parameters. Accordingly, in some cases, a constructed context mask may be obtained from the overlapping raw pixel data (e.g., the same data, a superset, a subset, or other partial overlap) with that from which the QID is obtained.

For the training mode, the memory may further include training protocols for the neural network (or other machine learning protocol). For example, the protocol may instruct that the weights of the neural network be adjusted over a determined number of training epochs using a determined number of input-result training pairs obtained from the captured constructed masks and derived QID.

Figure 2:
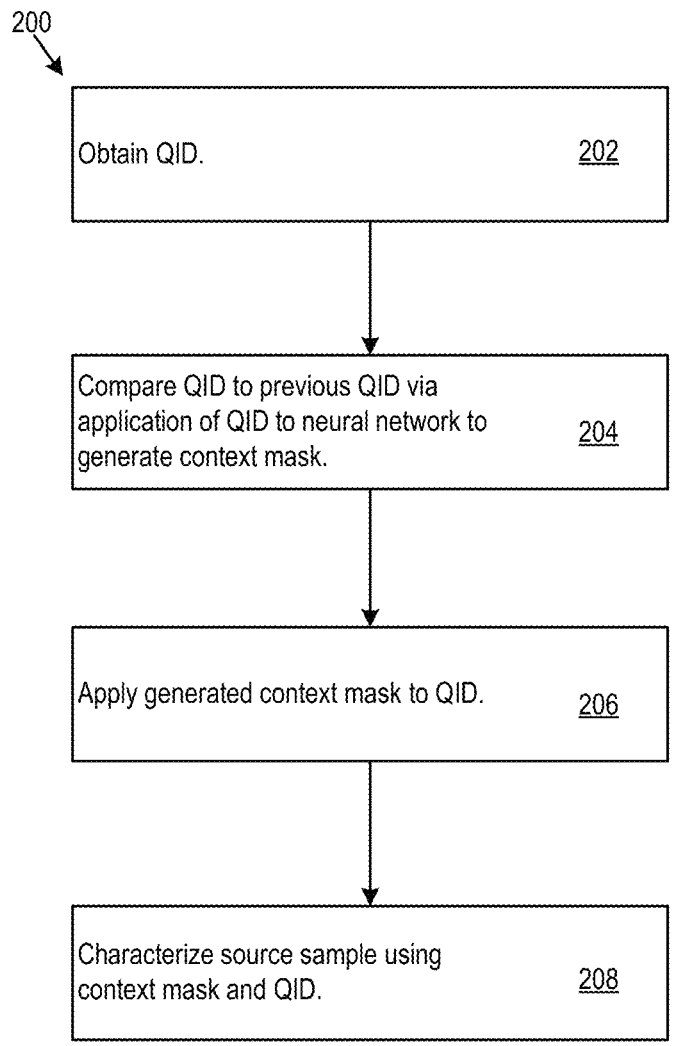
FIG. 2 shows example context mask generation logic.

Referring additionally to now to FIG. 2, example context mask generation logic (CMGL) 200 is shown. The CMGL 200 may execute on hardware circuitry, which may be implemented in various forms such as the processing subsystem 120 and/or the example CCE 500 discussed below. The CMGL 200 may obtain QID (202). For example, the CMGL 200 receive QID from a capture subsystem 110 that provides raw pixel data to a processing subsystem 120 (which may, in some cases, also include the CMGL 200) that derives the QID. In an example, the CMGL 200 may obtain the QID remotely over network interface circuitry (e.g., communication interfaces 512) or locally from memory (e.g., memory 122, 520).

The CMGL 200 may compare the QID to previous QID via application of the QID to the neural network (204). The neural network is trained using previous QID of the same type such that application of the "specific" QID being applied currently. Accordingly, processing of the specific QID using the neural network (and its interneuron weights) effects a comparison of similarities and differences between the specific QID and the previous QID. Based on those similarities and differences a specific context mask is generated for the specific QID.

The CMGL 200 may apply the generated context mask to the QID (206). The application of the context mask to the QID may provide context information that may complement characterization/analysis of the source sample (208). For example, the context mask may increase the contrast visible in the image used to represent the QID. In another example, the context mask may provide indications of expected dye concentrations (if a contrast dye were applied) at the pixels within the QID. The expected dye concentrations may indicate biological (or other material) structure type, health, or other status or classification. The context mask may provide simulated expert input. For example, the context mask indicates which pixels within the QID represent which biological structures. The context mask may provide context that would otherwise be obtained through a biologically-destructive (e.g., biological sample harming or killing) process using the QID which in some cases may be obtained through a non-destructive process.

Figure 3:
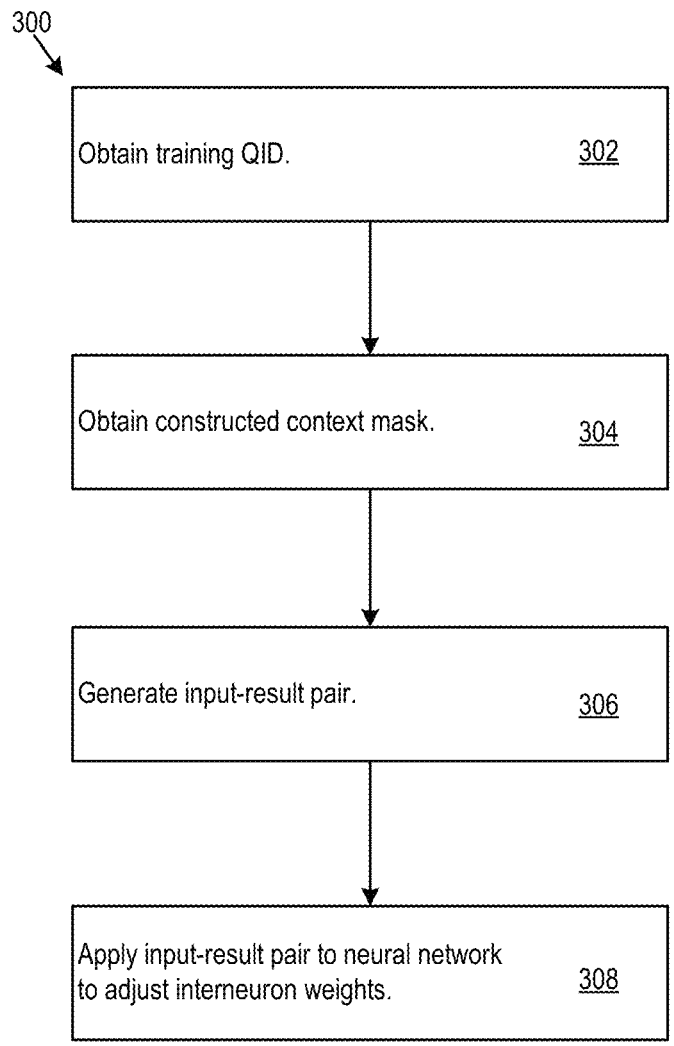
FIG. 3 shows example training logic.

Referring now to FIG. 3, example training logic (TL) 300 is shown. The TL 300 may execute on hardware circuitry, which may be implemented in various forms such as the processing subsystem 120 and/or the example CCE 500 discussed below. The TL 300 may obtain training QID (302). For example, the TL 300 may obtain training QID from the training mode output of the example device 100. In an example, the TL 300 may obtain QID from a training library stored in memory and/or via networking interface circuitry from a remote source.

The TL 300 may obtain a constructed mask (304). For example, the TL 300 may obtain the constructed mask from the training mode output of the example device 100. In an example, the TL 300 may construct mask from a training library stored in memory and/or via networking interface circuitry from a remote source. In an example, the TL 300 may obtain the constructed mask as feedback from an operator prompt requesting human input.

Using the training QID and corresponding constructed mask, the TL 300 may form an input-result pair (306).

The TL 300 may apply the input-result pair to the neural network to adjust interneuron weights (308). In various implementations, determination of the adjustment to the interneuron weights may include determining a deviation between the constructed context mask and simulated context mask generated by the neural network in its current state. In various implementations, the deviation may be calculated as a loss function, which may be iteratively reduced (e.g., over multiple training epochs) using an optimization function. Various example optimization functions for neural network training may include a least squares algorithm, a gradient descent algorithm, differential algorithm, a direct search algorithm, a stochastic algorithm, or other search algorithm.

Figure 4:
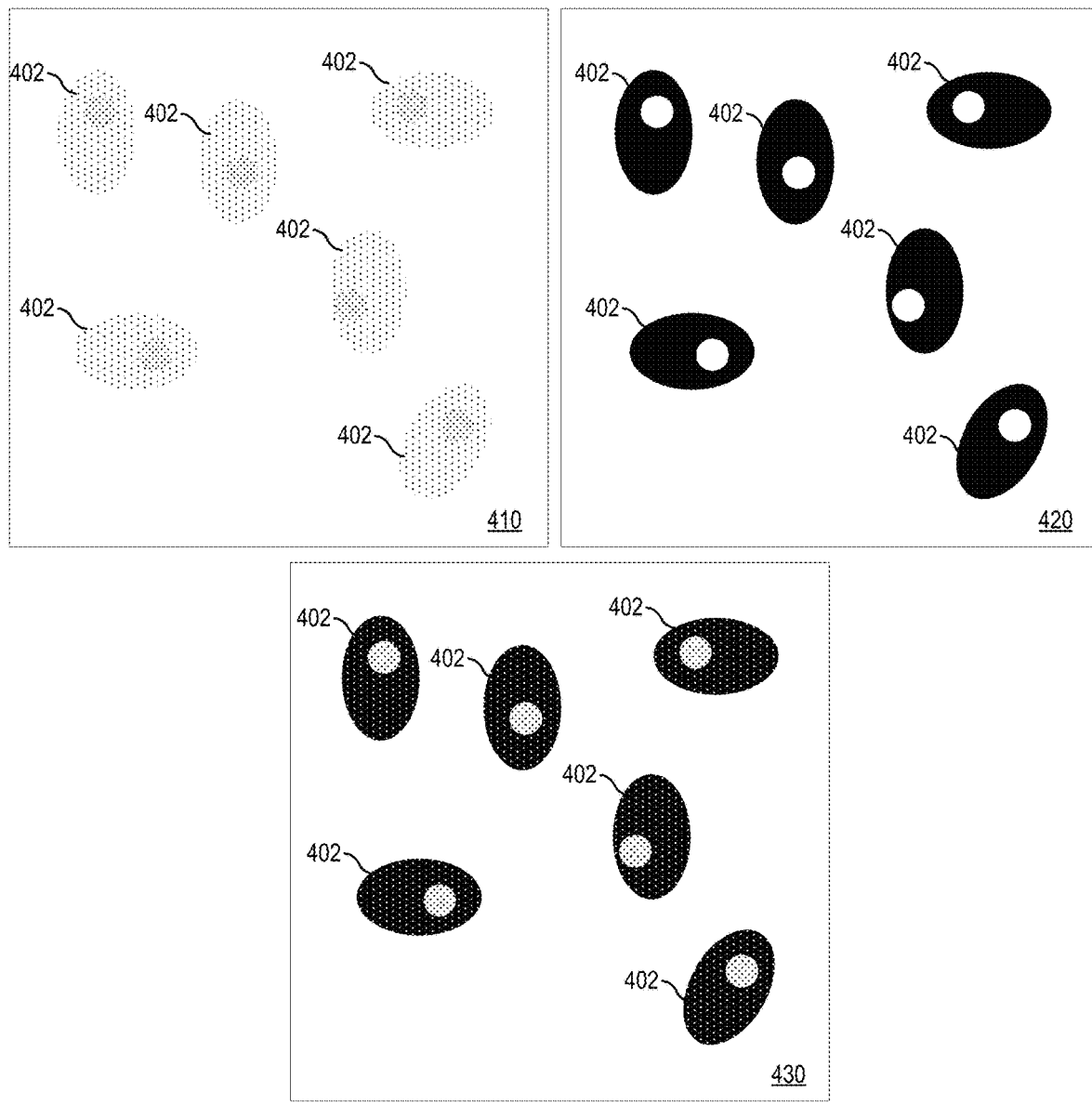
FIG. 4 shows example quantitative image data paired with an example context mask for example cells.

FIG. 4 shows example QID 410 paired with an example context mask 420 for example cells 402. The example QID 410 shows a density quantitative parameter (e.g., via the density of dots shown). However, in the example QID 410 low visual contrast inhibits ease of interpretation of the QID 410. The example context mask 420 provides tagging for the cell nucleus (white) and other portions (black). The combination QID/context 430 provides the density quantitative parameter mapped onto the tagging facilitating quantitative analysis of the cell structures.

Figure 5:
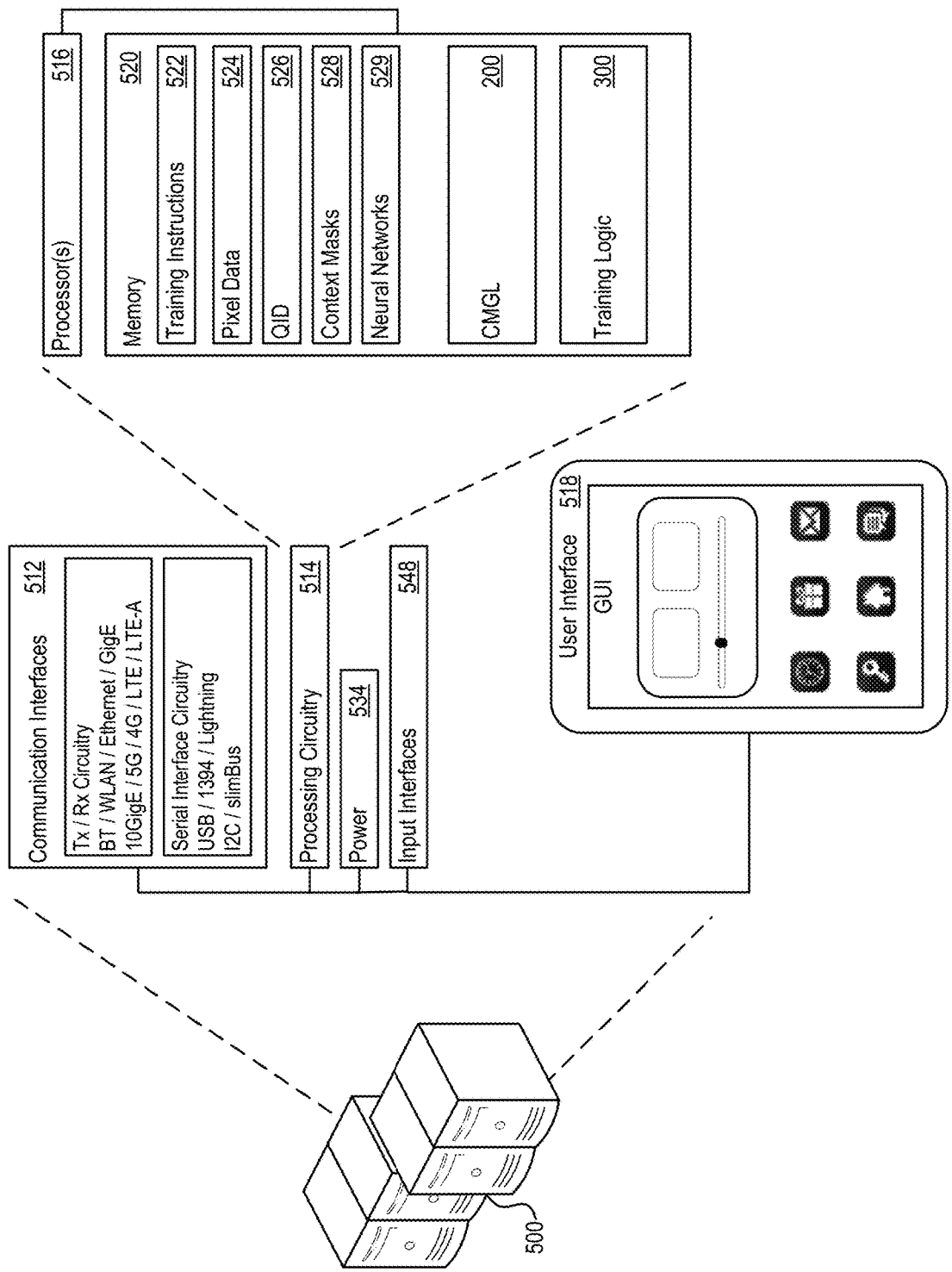
FIG. 5 shows an example context computation environment.

FIG. 5 shows an example context computation environment (CCE) 500, which may provide an execution environment for implementing generation of context masks and/or training of neural networks (or other machine learning protocols for image transformation). The CCE 500 may include system circuitry 514 to support tasks such as generation of context masks and/or training of neural networks (or other machine learning protocols for image transformation). The system circuitry 514 may include processors 516 (such as graphic processing units (GPUs)), memory 520, and/or other circuitry, which may be used to implement CMGL 200 and/or TL 300.

The memory 520 may be used to store training instructions 522, pixel data 524, QID 526, context masks 528, neural networks 529, or other data.

The memory 520 may further include the CMGL 200 and/or the TL 300 for execution by the system circuitry 514. The CCE 500 may also include one or more communication interfaces 512, which may support wireless, e.g. Bluetooth, Wi-Fi, WLAN, cellular (3G, 4G, LTE/A, 5G), and/or wired, ethernet, Gigabit ethernet, optical networking protocols. The communication interfaces 512 may support communication as network interface circuitry. The CCE 500 may include power management circuitry 534 and one or more input interfaces 548. The CCE 500 may be implemented on localized hardware or distributed or partially distributed (e.g., cloud-based) hardware platforms.

The CCE 500 may also include a user interface 518 that may include man-machine interfaces and/or graphical user interfaces (GUI). The GUI may be used to present interfaces and/or representations of QID, context masks, and/or quantitative parameters overlaid upon the context mask.

Figure 6:
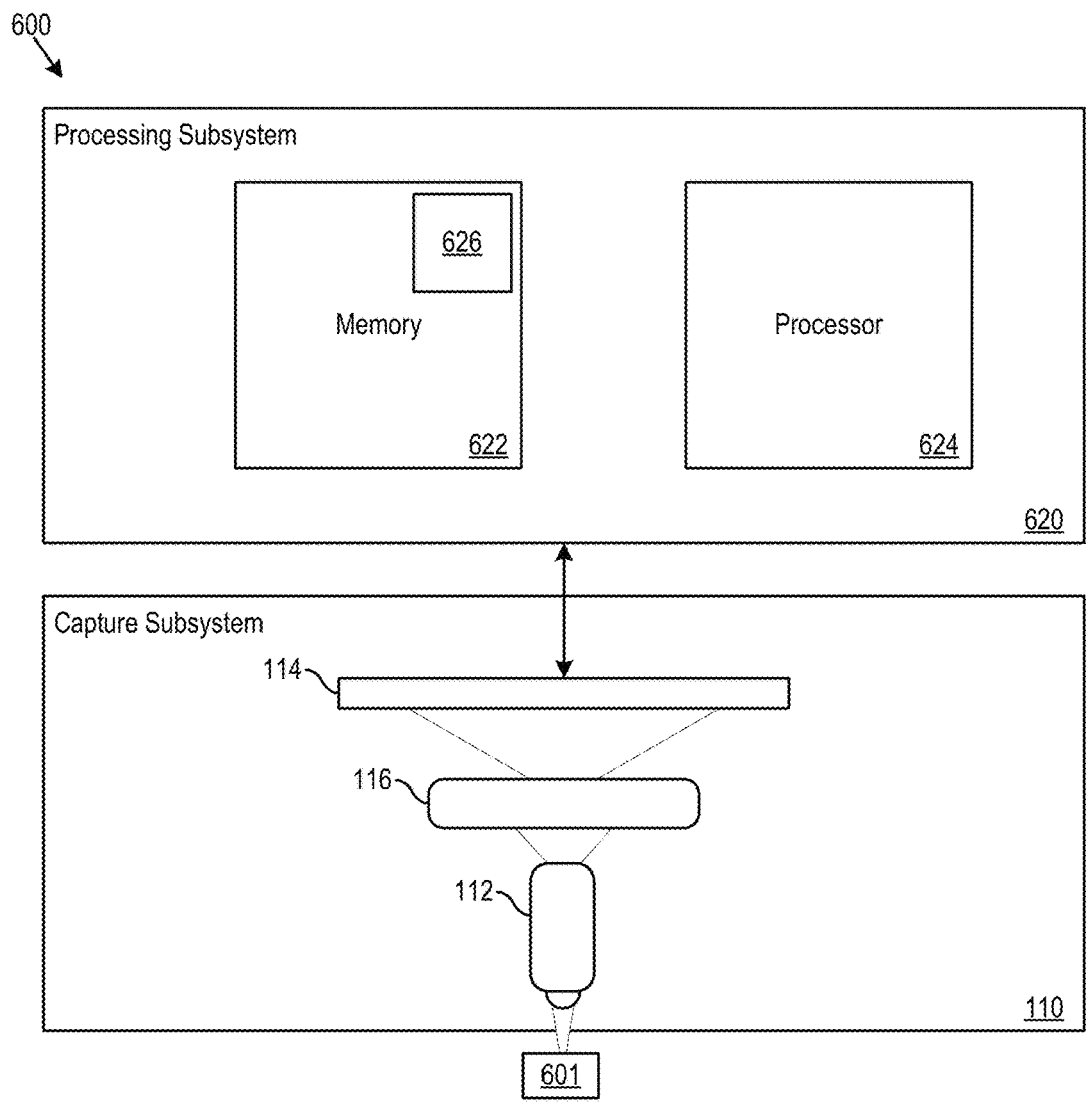
FIG. 6 shows an example biological imaging device for structure condition analysis.

Referring now to FIG. 6 an example biological imaging device 600 for structure condition analysis is shown. The example biological imaging device 600 may include a capture subsystem 110 for capture of QID images of a biological sample 601. In the example, the capture subsystem includes an objective 112 and a pixel array 114.

The example biological imaging device 600 may further include a processing subsystem 620. The processing subsystem may include memory 622 and a hardware-based processor 624. The memory 622 may store raw pixel data from the pixel array 114. The memory may further store QID determined from the raw pixel data and/or instructions for processing the raw pixel data to obtain the QID. Thus, the QID may include pixel values including visual data from the raw pixel data and/or quantitate parameters derived from analysis of the comparative effect and the pixel values of the raw pixel data. The memory may store a neural network (or other machine learning protocol) to generate a context mask based on the QID. The memory may store the context mask after generation.

The memory 622 may further store a structure integrity index 626. The structure integrity index 626 may include quantitative data on structures within previous biological data samples. After generation of context mask identifying biological structures depicted within the QID. The quantitative parameters for the pixels depicting the biological structures may be referenced against the data in the integrity index to determine condition of the biological structures. In an illustrative example, the structure integrity index may include dry mass density ratios between different parts of a sperm (e.g., between the head, the midpiece, and the tail). The dry mass density ratios between the different parts may serve as the index for various success probabilities for reaching various stages of reproductive maturity, e.g., zygote cleavage, embryo blastocyst rate, implantation, live birth, and/or other stages. Accordingly, after the parts of the sperm are identified and dry mass ratios are calculated, the ratios may be used to lookup success rates within the structure integrity index.

In various implementations, the processing subsystem 620 may perform the lookup and generate an indication of the condition determined by referencing the structure index. For example, metadata tags may be placed in the QID labeling the structures with the condition. In an example, visual data values in the QID may be altered to indicate the condition. In the illustrative example, sperm with success rate above a determined threshold may be altered to appear green when the visual portions of the processed QID are viewed.

The processor 624 may execute instructions stored on the memory to derive quantitative parameters from the raw pixel data. Further, the processor 624 may execute the neural network (or other machine learning protocol) stored on the memory 622 to generate the context mask. The processor 624 may execute the cross-reference of the structure integrity index 626 and generate the indication of the condition of the biological structure.

Figure 7:
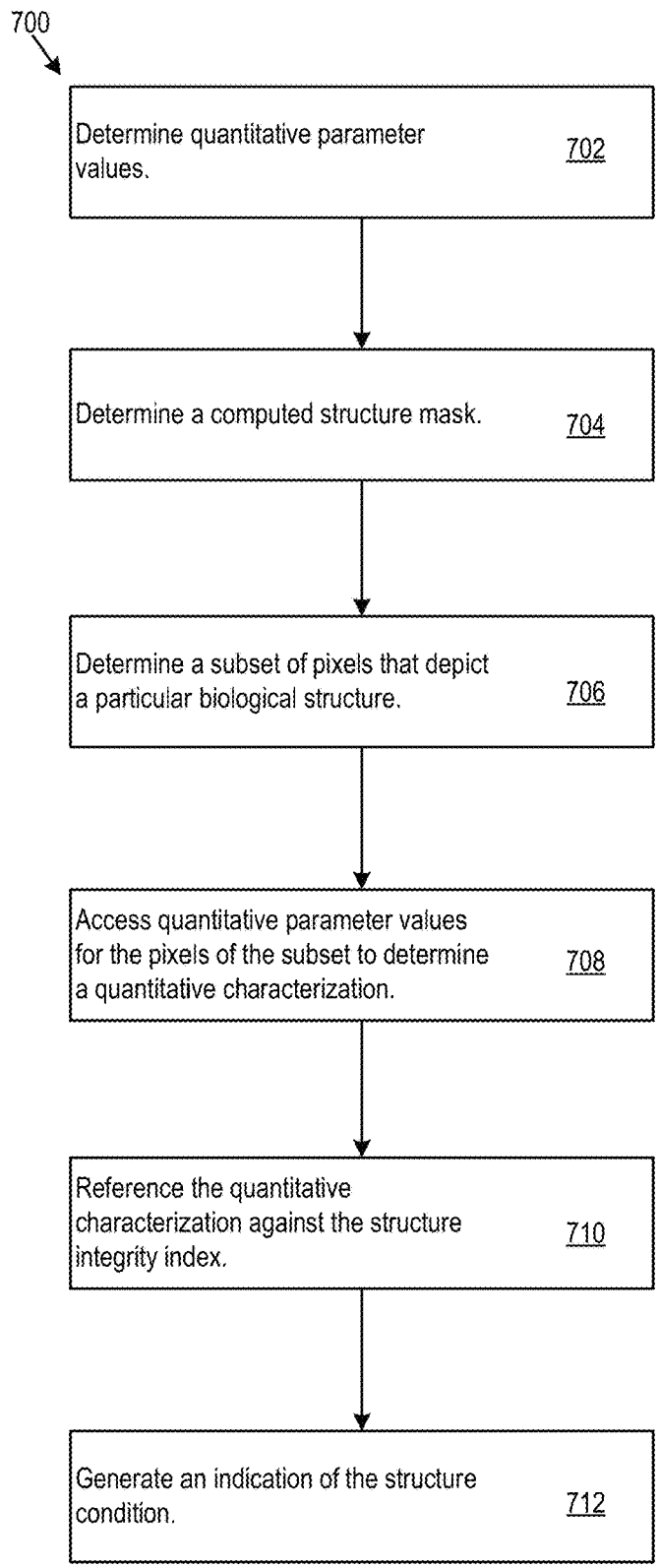
FIG. 7 shows example biological structure condition logic.

FIG. 7 shows example biological structure condition logic BSCL 700. The example BSCL 700 may execute on the processing subsystem of the example biological imaging device 600. The example BSCL 700 determine quantitative parameter values to generate QID from raw pixel data from the capture subsystem 110 of the biological imaging device 600 (702). The example BSCL 700 may determine a computed structure mask (704) via execution of a neural network. The computed structure mask may refer to a type context mask in which pixels depicting structures are labeled in accord with the depicted structure. In various implementations, the neural network used by the BSCL 700 may be trained using human-input labelled constructed masks as the training output. The example BSCL 700 may apply the computed structure mask to QID to determine a subset of pixels in the QID that depict a particular biological structure (706).

After identification of the subset, the BSCL 700 may access quantitative parameter values for the pixels of the subset to determine a quantitative characterization of the particular biological structure (708). In the illustrative example for sperm, the quantitative characterization may include determining dry mass ratios between the head and midpiece, head and tail, and midpiece and tail.

The BSCL 700 may reference the quantitative characterization against the structure integrity index (710) to determine a structure condition. In the illustrative example for sperm, the BSCL 700 may use the dry mass ratios between the parts to determine success rates.

The BSCL 700 may generate an indication of the structure condition (712). For example, a healthy structure (e.g., a sperm with high predicted success rates) may have visual data presented on a display altered such that the structure appears green. In an example, written tooltips may appear in the images. In some examples, metadata indicating success rates may be added to the QID. Other indications may be used. In various implementations, predictions (such as predicted success rates) may be based on empirical data, correlations, expert input, and/or other prediction input. In some cases, the quality and/or accuracy of the prediction may vary with the quality and/or accuracy of the predictive inputs.

Figure 8:
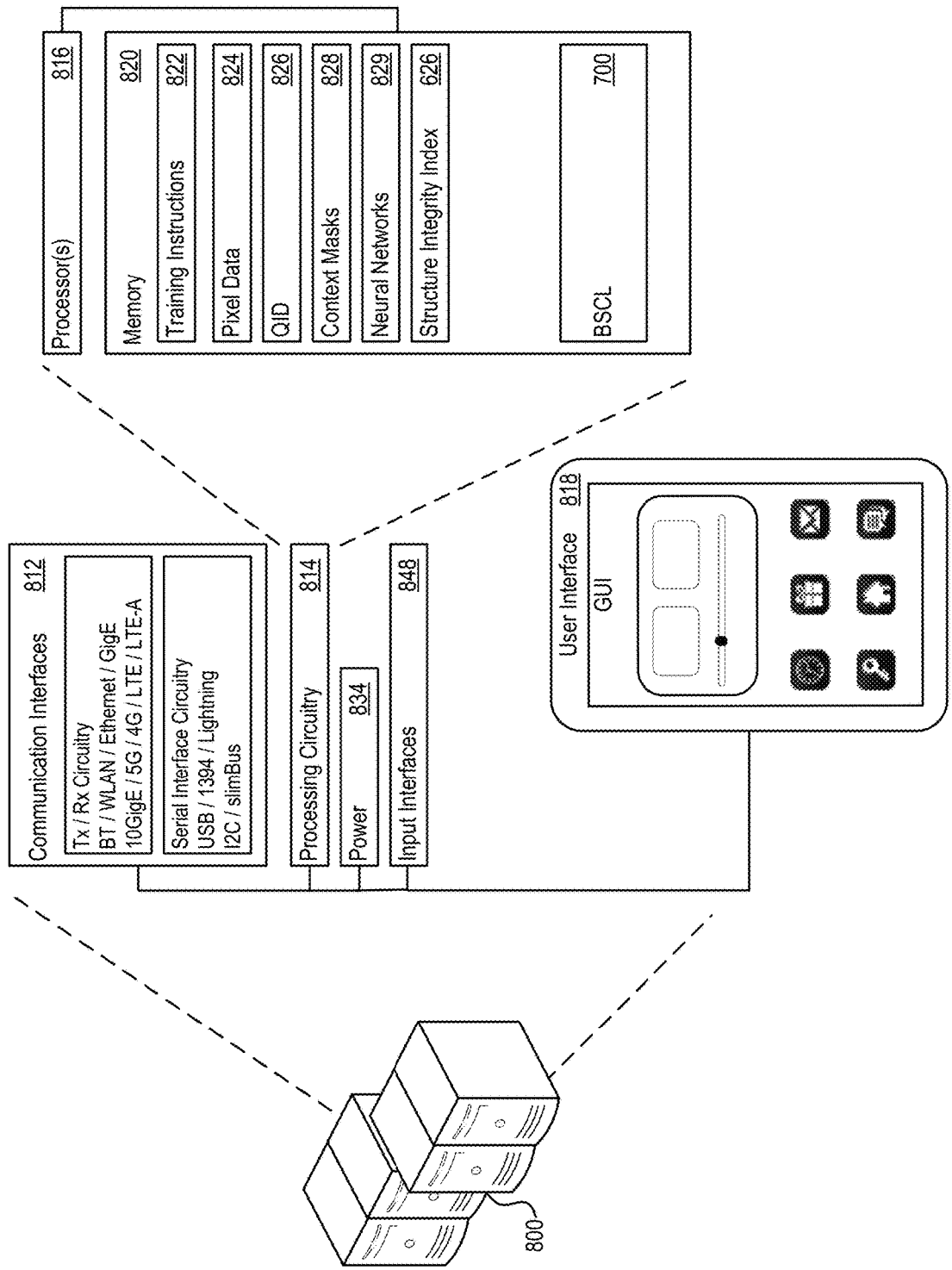
FIG. 8 shows an example structure condition computation environment.

FIG. 8 shows an example structure condition computation environment (SCCE) 800. The SCCE 800 may include system circuitry 814 to support tasks such as generation of computed structure masks and structure condition determination. The system circuitry 814 may include processors 816 (such as graphic processing units (GPUs)), memory 820, and/or other circuitry, which may be used to implement BSCL 700.

The memory 820 may be used to store training instructions 822, pixel data 824, QID 826, context masks 828, neural networks 829, the structure integrity index 626 or other data.

The memory 820 may further include the BSCL 700 for execution by the system circuitry 814. The SCCE 800 may also include one or more communication interfaces 812, which may support wireless, e.g. Bluetooth, Wi-Fi, WLAN, cellular (3G, 4G, LTE/A), and/or wired, ethernet, Gigabit ethernet, optical networking protocols. The communication interfaces 812 may support communication as network interface circuitry. The SCCE 800 may include power management circuitry 834 and one or more input interfaces 848. The SCCE 800 may be implemented on localized hardware or distributed or partially distributed (e.g., cloud-based) hardware platforms.

The SCCE 800 may also include a user interface 818 that may include man-machine interfaces and/or graphical user interfaces (GUI). The GUI may be used to present interfaces and/or visual representations of QID, context masks, and/or structure conditions.

Figure 9:
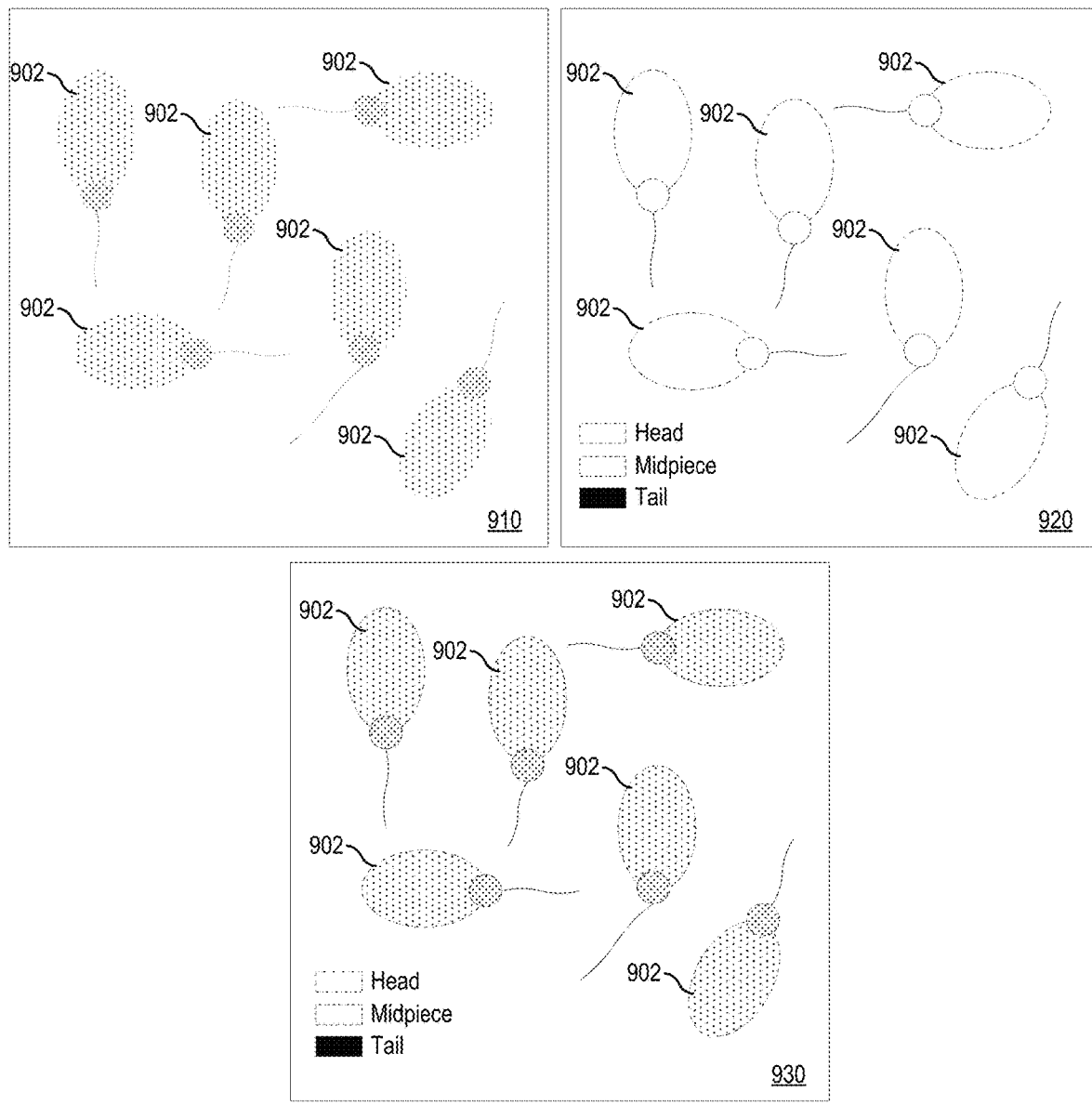
FIG. 9 shows example quantitative image data paired with an example computed structure mask.

FIG. 9 shows example QID 910 paired with an example computed structure mask 920 for spermatozoa 902. The example QID 910 shows a dry quantitative parameter (e.g., via the density of dots shown). However, in the example QID 910 the parts of the sperm are unidentified preventing calculation the dry mass ratios among the parts. The example computed structure mask 920 provides portions of the QID making up the head, midpiece, and tail of the spermatozoa 902. The combination QID/structure masks 930 provides the dry mass quantitative parameter mapped onto the tagged parts facilitating calculation of the dry mass ratios between the parts.

The methods, devices, processing, and logic described above and below may be implemented in many different ways and in many different combinations of hardware and software. For example, all or parts of the implementations may be circuitry that includes an instruction processor, such as a Graphics Processing Unit (GPU), Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry. Examples are listed in Table 1.

TABLE 1

Examples

A. A method including:
obtaining specific quantitative image data captured via a quantitative imaging technique, the specific quantitative image data including a quantitative parameter value and a pixel value for a pixel of the specific TABLE 1-continued Examples quantitative image data, where the quantitative parameter value is derived, at least in part, from the pixel value;
determining a specific context mask for the specific quantitative image data by comparing the specific quantitative image data to previous quantitative image data for a previous sample via application of the specific quantitative image data to the input of a neutral network trained using constructed context masks generated based on the previous sample and the previous quantitative image data;
applying the specific context mask to the specific quantitative image data to determine a context value for the pixel; and based on the pixel and
the quantitative parameter value, determining a quantitative characterization for the context value.
A2. The method of example A or any of the other examples in this table, including altering the pixel value to indicate the context value.
A3. The method of example A or any of the other examples in this table, where the constructed context masks include dye-contrast images captured of the previous samples after exposure of the previous samples to a contrast dye.
A4. The method of example A3 or any of the other examples in this table, where the contrast dye includes a fluorescent material.
A4B. The method of example A3 or any of the other examples in this table, where the context value includes an expected dye concentration level at the pixel.
A5. The method of example A or any of the other examples in this table, where the constructed context masks include operator input context designations.
A6. The method of example A5 or any of the other examples in this table, where the operator input context designations indicate that portions of an image depict an instance of a particular biological structure.
A6B. The method of example A6 or any of the other examples in this table, where the context value indicates a determination that the pixel depicts, at least in part, an instance of the particular biological structure.
A7. The method of example A or any of the other examples in this table, where: the quantitative imaging technique includes a non-destructive imaging technique; and constructed context masks include images captured via a biologically-destructive imaging technique.
A8. The method of example A or any of the other examples in this table, where the quantitative imaging technique includes:
quantitative phase imaging;
gradient light interference microscopy;
spatial light inference microscopy;
diffraction tomography;
Fourier transform light scattering; or
any grouping of the foregoing.
A9. The method of example A or any of the other examples in this table, where obtaining the specific quantitative image data captured via a quantitative imaging technique includes capturing the pixel value via a pixel capture array positioned at a plane of a comparative effect generated by light rays traversing an objective and a processing optic.
B. A method including:
obtaining quantitative image data captured via quantitative imaging of a sample, the quantitative image data including multiple pixels, each of the multiple pixels including a respective quantitate parameter value;
obtaining a constructed context mask for the sample, the constructed context mask including a context value for each of the multiple pixels;
creating an input-result pair by pairing the constructed context mask as a result to an input including the quantitative image data; and applying the input-result pair to a neural network to adjust interneuron weights within the neural network.
B2. The method of example B or any of the other examples in this table, where applying the input-result pair to a neural network includes determining a deviation from the constructed context mask by a simulated context mask at an output of the neural network when the quantitative image data is applied as an input to the neural network when a test set of interneuron weights are present within the neural network.
B3. The method of example B2 or any of the other examples in this table, where determining the deviation includes determining a loss value between the constructed context mask and the simulated context mask to quantify the deviation.

TABLE 1-continued

Examples

B4. The method of example B3 or any of the other examples in this table, where applying the input-result pair to a neural network to adjust interneuron weights within the neural network includes adjusting the interneuron weights to achieve a reduction in the loss function according to an optimization algorithm.
B5. The method of example B4 or any of the other examples in this table, where the optimization algorithm includes a least squares algorithm, a gradient descent algorithm, differential algorithm, a direct search algorithm, a stochastic algorithm, or any grouping thereof.
B6. The method of example B2 or any of the other examples in this table, where the neural network includes a U-net neural network to support an image transformation operation between the quantitative image data and the simulated context mask.
B7. The method of example B or any of the other examples in this table, where the constructed context mask includes a dye-contrast image captured of the samples after exposure of the samples to a contrast dye.
B8. The method of example B7 or any of the other examples in this table, where the contrast dye includes a fluorescent material.
B9. The method of example B or any of the other examples in this table, where the constructed context mask includes operator input context designations.
B10. The method of example B9 or any of the other examples in this table, where the operator input context designations indicate that portions of the quantitative image data depict an instance of a particular biological structure.
B11. The method of example B or any of the other examples in this table, where: the quantitative imaging includes a non-destructive imaging technique; and constructed context mask includes an image captured via a biologically-destructive imaging technique.
B12. The method of example B or any of the other examples in this table, where the quantitative imaging includes: quantitative phase imaging;
gradient light interference microscopy;
spatial light inference microscopy;
diffraction tomography;
Fourier transform light scattering; or
any grouping of the foregoing.
C. A biological imaging device including:
a capture subsystem including:
an objective;
a processing optic positioned relative to the objective to generate a comparative effect from a light ray captured through the objective;
a pixel capture array positioned at a plane of the comparative effect;
a processing subsystem including:
memory configured to store:
raw pixel data from the pixel capture array; and
computed quantitative parameter values for pixels of the raw pixel data; a neural network trained using constructed structure masks generated based on previous quantitative parameter values and previous pixel data;
a computed structure mask for the pixels;
a structure integrity index;
a processor in data communication with memory, the processor configured to: determine the computed quantitative parameter values for the pixels based on the raw pixel data and the comparative effect;
via execution of the neural network, determine the computed structure mask by assigning a subset of the pixels that represent portions of a selected biological structure identical mask values within the computed structure mask;
based on ones of the computed quantitative parameter values corresponding to the subset of the pixels, determine a quantitative characterization of the selected biological structure; and
reference the quantitative characterization against the structure integrity index to determine a condition of the selected biological structure.
C2. The biological imaging device of example C or any of the other examples in this table, where:
the biological imaging device includes an assistive-reproductive-technology (ART) imaging device; and
the biological structure includes a structure within a gamete, a zygote, a blastocyst, or any grouping thereof; and
optionally, the condition includes a predicted success rate for zygote cleavage or other reproductive stage.
D. A device including:
memory configured to store:
specific quantitative image data for pixels of the pixel data captured via a quantitative imaging technique, the specific quantitative image data including a quantitative parameter value and a pixel value for a pixel of the specific quantitative image data, where the quantitative parameter value is derived, at least in part, from the pixel value;
a neutral network trained using constructed context masks generated based on a previous sample and a previous quantitative image data, the previous quantitative image data captured by preforming the quantitative imaging technique on the previous sample; and
a computed structure mask for the pixels;
a processor in data communication with memory, the processor configured to:
obtain the specific quantitative image data captured via a quantitative imaging technique, the specific quantitative image data including a quantitative parameter value and a pixel value for a pixel of the specific quantitative image data, where the quantitative parameter value is derived, at least in part, from the pixel value;
determine a specific context mask for the specific quantitative image data by comparing the specific quantitative image data to previous quantitative image data by applying the specific quantitative image data to the input of the neutral network;
apply the specific context mask to the specific quantitative image data to determine a context value for the pixel; and
based on the pixel and the quantitative parameter value, determine a quantitative characterization for the context value.
E. A device to implement the method of any example in this table.
F. A method implemented by operating the device of any of the examples in this table.
G. A system configured to implement any of or any combination of the features described in the specification and/or the examples in this table.
H. A method including implementing any of or any combination of the features described in the specification and/or the examples in this table.
I. A product including:
machine-readable media;
instructions stored on the machine-readable media, the instructions configured to cause a machine to implement any of or any combination of the features described in the specification and/or the examples in this table.
J. The product of example I, where:
the machine-readable media is other than a transitory signal; and/or the instructions are executable.

Example Implementations

The example implementations below are intended to be illustrative examples of the techniques and architectures discussed above. The example implementations are not intended to constrain the above techniques and architectures to particular features and/or examples but rather demonstrate real world implementations of the above techniques and architectures. Further, the features discussed in conjunction with the various example implementations below may be individually (or in virtually any grouping) incorporated into various implementations of the techniques and architectures discussed above with or without others of the features present in the various example implementations below.

Artificial intelligence (AI) can transform one form of contrast into another. Various example implementations include phase imaging with computational specificity (PICS), which includes a combination of quantitative phase imaging and AI, which provides quantitative information about unlabeled live cells with high specificity. In various example implementations, an imaging system allows for automatic training, while inference is built into the acquisition software and runs in real-time. In certain embodiments of the present disclosure, by applying computed specificity maps back to QPI data, the growth of both nuclei and cytoplasm may be measured independently, over many days, without loss of viability. In various example implementations, using a QPI method that suppresses multiple scattering, the dry mass content of individual cell nuclei within spheroids may be measured.

The ability to evaluate sperm at the microscopic level, using high throughput would be useful for assisted reproductive technologies (ART), as it can allow specific selection of sperm cells for in vitro fertilization (IVF). The use of fluorescence labels has enabled new cell sorting strategies and given new insights into developmental biology.

In various example implementations, a trained a deep convolutional neural network to performs semantic segmentation on quantitative phase maps. This approach, a form of phase imaging with computational specificity, allows analyzing thousands of sperm cells and identifying correlations between dry mass content and artificial reproduction outcomes. Determination of the dry mass content ratios between the head, midpiece, and tail of the sperm cells can be used to predict the percentages of success for zygote cleavage and embryo blastocyst rate.

The high incidence of human male factor infertility suggests a need for examining new ways of evaluating male gametes. Certain embodiments of the present disclosure provide a new approach that combines label-free imaging and artificial intelligence to obtain nondestructive markers for reproductive outcomes. The phase imaging system reveals nanoscale morphological details from unlabeled cells. Deep learning provides a specificity map segmenting with high accuracy the head, midpiece, and tail. Using these binary masks applied to the quantitative phase images, we measure precisely the dry mass content of each component. The dry mass ratios represent intrinsic markers with predictive power for zygote cleavage, and embryo blastocyst development.

Various example implementations include phase imaging with computational specificity in which QPI and AI are combined to infer quantitative information from unlabeled live cells, with high specificity and without loss of cell viability.

Various example implementations include a microscopy concept, referred to as phase imaging with computational specificity (PICS), in which the process of learning is automatic and retrieving computational specificity is part of the acquisition software, performed in real-time. In various example implementations, deep learning is applied to QPI data, generated by SLIM (spatial light interference microscopy) and GLIM (gradient light interference microscopy). In some cases, these systems may use white-light and common-path setups and, thus, provide high spatial and temporal sensitivity. Because they may be add-ons to existing microscopes and are compatible with the fluorescence channels, these systems provide simultaneous phase and fluorescence images from the same field of view. As a result, the training data necessary for deep learning is generated automatically, without the need for manual annotation. In various example implementations, QPI may replace some commonly used tags and stains and eliminate inconveniences associated with chemical tagging. This is demonstrated in real world examples with various fluorescence tags and operations on diverse cell types, at different magnifications, on different QPI systems. Combining QPI and computational specificity allows us to quantify the growth of subcellular components (e.g. nucleus vs cytoplasm) over many cell cycles, nondestructively. Using GLIM, spheroids where imaged, which demonstrates that PICS can perform single-cell nucleus identification even in such turbid structures.

In various example implementations, PICS performs automatic training by recording both QPI and fluorescence microscopy of the same field of view, on the same camera, with minimal image registration. The two imaging channels are integrated seamlessly by our software that controls both the QPI modules, fluorescence light path, and scanning stage. The PICS instrument can scan a large field of view, e.g., entire microscope slides, or multi-well plates, as needed. PICS can achieve multiplexing by automatically training on multiple fluorophores and performing inference on single-phase image. PICS performs real-time inference, because the AI code may be implemented into the live acquisition software. The computational inference is faster than the image acquisition rate in SLIM and GLIM, which is up to 15 frames per second, thus, we add specificity without noticeable delay. To the microscope user, it may be difficult to state whether the live image originates in a fluorophore or the computer GPU. Using the specificity maps obtained by computation, the QPI channel is exploited to compute the dry mass density image associated with the particular subcellular structures. For example, using this procedure, we demonstrated a previously unachievable task: the measurement of growth curves of cell nuclei vs. cytoplasm over several days, nondestructively. Using a QPI method dedicated to imaging 3D cellular systems (GLIM), we can add subcellular specificity into turbid structures such as spheroids.

In an proof-of-concept example, use an inverted microscope (Axio Observer Z1, Zeiss) equipped with a QPI module (CellVista SLIM Pro and CellVista GLIM Pro, Phi Optics, Inc.). Other microscope systems may be used. The microscope is programmed to acquire both QPI and fluorescence images of fixed, tagged cells. Once the microscope "learned" the new fluorophore, PICS can perform inference on the live, never labeled cells. Due to the absence of chemical toxicity and photobleaching, as well as the low power of the white light illumination, PICS can perform dynamic imaging over arbitrary time scales, from milliseconds to weeks, without cell viability concerns. Simultaneous experiments involving multi-well plates can be performed to assay the growth and proliferation of cells of specific cellular compartments. The inference is implemented within the QPI acquisition time, such that PICS performs in real-time.

PICS combines quantitative measurements of the object's scattering potential with fluorescence microscopy. The GLIM module controls the phase between the two interfering fields outputted by a DIC microscope. We acquired four intensity images corresponding to phase shifts incremented in steps of $\pi/2$ and combined these to obtain a quantitative phase gradient map. This gradient is integrated using a Hilbert transform method, as described in. The same camera records fluorescence images via epi-illumination providing a straightforward way to combine the fluorescence and phase images.

In various example implementations, co-localized image pairs (e.g., input-result pairs) are used to train a deep convolutional neural network to map the label-free phase images to the fluorescence data. For deep learning, a variant of U-Net with three modifications may be used. A batch normalization layers before all the activation layers is added, which helps accelerate the training. The number of parameters in the network may be reduced by changing the number of feature maps in each layer of the network to a quarter of the original size. This change reduced GPU memory usage during training, without loss of performance. The modified U-Net model used approximately 1.9 million parameters, while another implementation had over 30 million parameters.

Residual learning was implemented with the hypothesis that it is easier for the models to approximate the mapping from phase images to the difference between phase images and fluorescence images. Thus, an add operation between the input and the output of the last convolutional block to generate the final prediction was added.

In various example implementations, high fidelity digital stains can be generated from as few as 20 image pairs (roughly 500 sample cells).

Because of the nondestructive nature of PICS, it may be applied to monitor cells over extended periods, of many days, without a noticeable loss in cell viability. In order to demonstrate a high content cell growth screening assay, unlabeled SW480 and SW620 cells were imaged over seven days and PICS predicted both DAPI (nucleus) and DIL (cell membrane) fluorophores. The density of the cell culture increased significantly over the seven-day period, a sign that cells continued their multiplication throughout the duration of imaging. PICS can multiplex numerous stain predictions simultaneously, as training can be performed on an arbitrary number of fluorophores for the same cell type. Multiple networks can be evaluated in parallel on separate GPUs.

PICS-DIL may be used to generate a binary mask, which, when applied to the QPI images, yields the dry mass of the entire cell. Similarly, PICS-DAPI allows the nuclear dry mass to be obtained. Thus, the dry mass content of the cytoplasm and nucleus can be independently and dynamically monitored.

GLIM may extend QPI applications to thicker, strongly scattering structures, such as embryos, spheroids, and acute brain slices. GLIM may improves image quality by suppressing artifacts due to multiple scattering and provides a quantitative method to assay cellular dry-mass. PICS can infer the nuclear map with high accuracy. A binary mask using PICS and DAPI images was created. The fraction of mass found inside the two masks was compared. In the example proof-of-concept, the average error between inferring nuclear dry mass based on the DAPI vs. PICS mask is 4%.

In various example implementations, by decoupling the amplitude and phase information, QPI images outperform their underlying modalities (phase contrast, DIC) in AI tasks. This capability is showcased in GLIM which provides high-contrast imaging of thick tissues, enabling subcellular specificity in strongly scattering spheroids.

In various example implementations, SLIM uses a phase-contrast microscope in a similar way to how GLIM used DIC. SLIM uses a spatial light modulator matched to the back focal plane of the objective to control the phase shift between the incident and scattered components of the optical field. Four such phase-contrast like frames may be recorded to recover the phase between the two fields. The total phase is obtained by estimating the phase shift of the transmitted component and compensating for the objective attenuation. The "halo" associated with phase-contrast imaging is corrected by a non-linear Hilbert transform-based approach.

In various example implementations, while SLIM may have higher sensitivity, the GLIM illumination path may perform better in some strongly scattering samples and dense well plates. In strongly scattering samples, the incident light, which acts as the reference field in SLIM, vanishes exponentially. In dense microplates, the transmitted light path is distorted by the meniscus or blocked by high wall.

In various example implementations, a hardware backend may implement TensorRT (NVIDIA) to support real-time inference. In an example GLIM system, the phase shift is introduced by a liquid crystal variable retarder, which takes approximately 70 ms to fully stabilize. In an example implementation, SLIM system a ring pattern is written on the modulator and 20 ms is allowed for the crystal to stabilize. Next, four such intensity images are collated to reconstruct the phase map. In GLIM, the image is integrated and in SLIM the phase-contrast halo artifact (is removed. The phase map is then passed into a deep convolution neural network based on the U-Net architecture to produce a synthetic stain. The two images are rendered as an overlay with the digital stain superimposed on the phase image. In the "live" operating mode used for finding the sample and testing the network performance, a PICS image is produced for every intensity frame. In various example implementations, the rate-limiting factor is the speed of image acquisition rather than computation time.

The PICS system may use a version of the U-Net deep convolutional neural architecture to translate the quantitative phase map into a fluorescence one. To achieve real-time inference, TensorRT (NVIDIA) may be which automatically tunes the network for the specific network and graphics processing unit (GPU) pairings.

In various example implementations, the PICS inference framework is designed to account for differences between magnification and camera frame size. Differences in magnification are accounted for by scaling the input image to the networks' required pixel size using various libraries, such as NVIDIA's Performance Primitives library. To avoid tuning the network for each camera sensor size, an optimized network for the largest image size and extend smaller images by mirror padding may be created. To avoid the edge artifacts typical of deep convolutional neural networks, a 32-pixel mirror pad may be performed for inferences.

In various example implementations, a neural network with a U-Net architecture, which effectively captures the broad features typical of quantitative phase images, may be used. Networks were built using TensorFlow and Keras, with training performed on a variety of computers including workstations (NVIDIA GTX 1080 & GTX 2080) as well as isolated compute nodes (HAL, NCSA, 4× NVIDIA V100). Networks were trained with the adaptive moment estimator (ADAM) against a mean squared error optimization criterion. Phase and fluorescence microscopy images, I(x,y), were normalized for machine learning as $$I_{ml\ input}(x, y) = med\left(0, \frac{I, (x, y(-\rho_{min})}{\rho_{max} - \rho_{min}}, 1\right) \quad [1]$$

where $\rho_{min}$ and $\rho_{max}$ are the minimum, and maximum pixel values across the entire training set, and med is a pixel-wise median filter designed to bring the values within the range [0,1]. Spatio-temporal broadband quantitative phase images exhibit strong sectioning and defocus effects. To address focus related issues, images were acquired as a tomographic stack. In various example implementations, the Haar wavelet criterion from may be used to select the three most in-focus images for each mosaic tile.

The SW480 and SW620 pairing is a popular model for cancer progression as the cells were harvested from the tumor of the same patient before and after a metastasis event. Cells were grown in Leibovitz's L-15 media with 10% FBS and 1% pen-strep at atmospheric $CO_2$. Mixed SW cells were plated at a 1:1 ratio at approximately 30% confluence. The cells were then imaged to demonstrate that the various example implementations may be used for imaging in real-world biological applications as discussed in U.S. Provisional Application No. 62/978,194, which was previously incorporated by reference.

In various example implementations, highly sensitive QPI in combination with deep learning allows us to identify subcellular compartments of unlabeled bovine spermatozoa. The deep learning semantic segmentation model automatically segments the head, midpiece, and tail of individual cells. These predictions may be used to measure the respective dry mass of the components. We found that the relative mass content of these components correlates with the zygote cleavage and embryo quality. The dry mass ratios, i.e. head/midpiece (H/M), head/tail (H/T), midpiece/tail (M/T), can be used as intrinsic markers for reproductive outcomes.

To image the unlabeled spermatozoa SLIM, or other QI techniques, may be used. Due to the white light illumination, SLIM lacks speckles, which yields sub-nanometer pathlength spatial sensitivity.

A representative sperm cell may be reconstructed from a series of through-focus measurements (z-stack). Various cellular compartments may be revealed with high resolution and contrast. The highest density region of the sperm is the mitochondria-rich neck (or midpiece), which is connected to a denser centriole vault leading to the head. Inside the head, the acrosome appears as a higher density sheath surrounding a comparably less optically dense nucleus. The posterior of the sperm consists of a flagellum followed by a less dense tail.

The training data were annotated manually by individuals trained to identify the sperm head, midpiece, and tail. A fraction of the tiles was manually segmented by one annotator using ImageJ. The final segmentations were verified by a second annotator. In In an example implementation, for the sperm cells, the sharp discontinuity between the background and cell was traced, separated by an abrupt change in refractive index. As a proof-of-concept and to reduce computing requirements, images were down-sampled to match the optical resolution. To account for the shift variance of all convolutional neural networks, the data were augmented by a factor of 8, using rotation, flipping, and translation. To improve the segmentation accuracy, a two-pass training procedure where an initial training round was corrected and used for a second, final round was used. Manual annotation for the second round is comparably fast, and we corrected mostly for debris and other forms of obviously defective segmentation. The resulting semantic segmentation maps were applied to the phase image to compute the dry mass content of each component. By using a single neural network, rather than a group of annotators, differences in annotation style can be compensated. In the example implementation, training and inference were performed on twenty slides.

For semantic segmentation, in the example implementation, a U-Net based deep convolution neural network was used. The last sigmoid layer in the U-Net with a softmax layer, which predicts the class probability of every single pixel in the output layer, is replaced. The final segmentation map can be obtained by applying an argmax function on the neural network output. The model is trained using categorical cross entropy loss and Adam Optimizer. The model was trained with a learning rate of 5e-6 and a batch size of 1 for 30 epochs. Within each epoch, the model was given 3,296 image pairs for weight update. The model attained an F1-score of over 0.8 in all four classes. Once the model is trained, the weights are ported into the imaging software.

The dry mass ratios between the head, midpiece, and tail were measured, rather than the absolute dry mass, for which there were no statistically significant correlations.

The results from the proof-of-concept suggest that a long tail is beneficial. However, when we evaluate the embryo blastocyst development rate, it appears that a large H/M value is desirable, while the other two ratios are only weakly correlated. This result appears to indicate that a denser head promotes embryo blastocyst development. Note that this subgroup of spermatozoa that are associated with the embryo blastocyst development rate have, with a high probability, large tails.

Having a head or midpiece with relatively more dry mass penalizes early stages of fertilization (zygote cleavage, negative trend) while having a larger head relative to midpiece is important for embryo development (blastocyst rate, positive trend).

Various example implementations would be useful when selecting among seemingly healthy sperm, with no obvious defects. Various example implementations may be used for automating the annotation of a large number of cells.

IVF clinics have been using phase contrast microscopes for nondestructive observation. In various example implementations, PICS can be implemented to these existing systems as an add-on.

Deep Learning

In various example implementations, the task may be formulated as a 4-class semantic segmentation problem and adapted from the U-Net architecture. The example model may take as input a SLIM image of dimension 896×896 and produce a 4-channel probability distribution map, one for each class (head, neck, tail and background). An argmax function is then applied on this 4-channel map to obtain the predicted segmentation mask. The model is trained with categorical cross entropy loss (see equation (2)) and the gradient is computed using Adam optimizer. The model may be trained with a learning rate of 5e-6 for 30 epochs. The batch size is set to 1, but may be increased with greater GPU memory availability. Within each epoch, the model weights were updated 3296 steps as each image is augmented 8 times.

$$E = \frac{1}{r \times c} \cdot \sum_{r=1}^{h} \sum_{c=1}^{w} \sum_{k=1}^{4} [\delta(y[r][c] = = k) \cdot \log(\hat{y}[r][c][k])] \quad (2)$$

The trained model was run on the test set and recorded the confusion matrix. To understand the performance of the model, precision, recall and F-1 score (see equation (2)~(4)) were utilized.

$$\text{Precision} = \frac{\text{True Positive}}{\text{Predicted Positive}} = \frac{\text{True Positive}}{\text{True Positive} + \text{False Positive}} \quad (3)$$

$$\text{Recall} = \frac{\text{True Positive}}{\text{Labeled Positive}} = \frac{\text{True Positive}}{\text{True Positive} + \text{False Negative}} \quad (4)$$

$$F1 = \frac{2}{\frac{1}{\text{Precision}} + \frac{1}{\text{Recall}}} = \frac{2 \cdot \text{Precision} \cdot \text{Recall}}{\text{Precision} + \text{Recall}} \quad (5)$$

The model achieved over 0.8 F-1 score on all four classes.

Once the model is trained, the kernel weights were transposed using a python script into the TensorRT-compatible format. The exact same network architecture was constucted using TensorRT C++ API and loaded the trained weights. This model was then constructed on GPU and optimized layer-by-layer via TensorRT for best inference performance.

The model based on the modified U-Net architecture discussed above was trained for 100 epochs with a learning rate of 1e-4. The model also achieved over 0.8 F1-Score for all four classes. In particular, it reached 0.94 F1-Score for segmenting the head.

Various implementations have been specifically described. However, many other implementations are also possible.

What is claimed is:

1. A method including:
   obtaining specific quantitative image data captured via a quantitative imaging technique of a sample, the specific quantitative image data including, for each pixel of the specific quantitative image data, a quantitative parameter value and a pixel value, where the quantitative parameter value for the pixel is derived, at least in part, from the pixel value for the pixel;
   determining a specific context mask for the specific quantitative image data by comparing the specific quantitative image data to previous quantitative image data for a previous sample via application of the specific quantitative image data to an input of a neutral network trained using constructed context masks generated based on the previous sample and the previous quantitative image data;
   applying the specific context mask to the specific quantitative image data to determine a context value for the pixel, wherein the context value includes an expected dye concentration level at the pixel;
   based on the pixel and the quantitative parameter value, determining a quantitative characterization for the context value; and
   referencing the quantitative characterization against a structure integrity index to determine a condition of the sample.

2. The method of claim 1, including altering the pixel value to indicate the context value.

3. The method of claim 1, where the constructed context masks include a dye-contrast image captured of the previous sample after exposure of the previous sample to a contrast dye.

4. The method of claim 3 where the contrast dye includes a fluorescent material.

5. The method of claim 1 where the constructed context masks include operator input context designations.

6. The method of claim 5, where the operator input context designations indicate that portions of an image depict an instance of a particular biological structure.

7. The method of claim 6, where the context value indicates a determination that the pixel depicts, at least in part, an instance of the particular biological structure.

8. The method of claim 1, where:
   the quantitative imaging technique includes a non-destructive imaging technique; and
   constructed context masks include images captured via a biologically-destructive imaging technique.

9. The method of claim 1, where the quantitative imaging technique includes:
   quantitative phase imaging;
   gradient light interference microscopy;
   spatial light inference microscopy;
   diffraction tomography;
   Fourier transform light scattering; or
   any grouping of the foregoing.

10. The method of claim 1, where obtaining the specific quantitative image data captured via a quantitative imaging technique includes capturing the pixel value via a pixel capture array positioned at a plane of a comparative effect generated by light rays traversing an objective and a processing optic.

11. A method including:
    obtaining quantitative image data captured via quantitative imaging of a sample, the quantitative image data including multiple pixels, each of the multiple pixels including a respective quantitate parameter value, wherein the quantitate parameter value is derived from a raw pixel value of each pixel;
    obtaining a constructed context mask for the sample, the constructed context mask including a context value for each of the multiple pixels;
    creating an input-result pair by pairing the constructed context mask as a result to an input including the quantitative image data, wherein the context value includes an expected dye concentration level at the pixel;
    applying the input-result pair to a neural network to adjust interneuron weights within the neural network;
    determining a quantitative characterization for the context value; and
    referencing the quantitative characterization against a structure integrity index to determine a condition of the sample.

12. The method of claim 11, where applying the input-result pair to a neural network includes determining a deviation from the constructed context mask by a simulated context mask at an output of the neural network when the quantitative image data is applied as an input to the neural network when a test set of interneuron weights are present within the neural network.

13. The method of claim 12, where determining the deviation includes determining a loss value between the constructed context mask and the simulated context mask to quantify the deviation.

14. The method of claim 13, where applying the input-result pair to a neural network to adjust interneuron weights within the neural network includes adjusting the interneuron weights to achieve a reduction in the loss value according to an optimization algorithm.

15. The method of claim 12, where the neural network includes a U-net neural network to support an image transformation operation between the quantitative image data and the simulated context mask.

16. The method of claim 11, where the constructed context mask includes a dye-contrast image captured of the sample after exposure of the sample to a contrast dye.

17. The method of claim 11, where:
the quantitative imaging includes a non-destructive imaging technique; and
constructed context mask includes an image captured via a biologically-destructive imaging technique.

18. A biological imaging device including:
a capture subsystem including:
 an objective;
 a processing optic positioned relative to the objective to generate a comparative effect from a light ray captured through the objective;
 a pixel capture array positioned at a plane of the comparative effect;
a processing subsystem including:
 memory configured to store:
  raw pixel data from the pixel capture array; and
  quantitative parameter values for pixels of the raw pixel data;
  a neural network trained using constructed structure masks generated based on previous quantitative parameter values and previous pixel data;
  a computed structure mask for the pixels;
  a structure integrity index;
 a processor in data communication with memory, the processor configured to:
  determine the quantitative parameter values for the pixels based on the raw pixel data and the comparative effect, wherein the quantitate parameter values are derived from raw pixel values;
  via execution of the neural network, determine the computed structure mask by assigning a subset of the pixels that represent portions of a selected biological structure identical mask values within the computed structure mask;
  apply the computed structure mask to the raw pixel data to determine a context value for the pixel, wherein the context value includes an expected dye concentration level at the pixel;
  based on ones of the quantitative parameter values corresponding to the subset of the pixels, determine a quantitative characterization of the selected biological structure; and
  reference the quantitative characterization against the structure integrity index to determine a condition of the selected biological structure.

19. The biological imaging device of claim 18, where:
the biological imaging device includes an assistive-reproductive-technology (ART) imaging device;
the biological structure includes a structure within a sperm; and
the condition includes a predicted success rate for zygote cleavage after fertilization of an ovum by the sperm.

* * * * *